United States Patent
Shafiee et al.

(10) Patent No.: US 10,505,791 B2
(45) Date of Patent: Dec. 10, 2019

(54) SYSTEM AND METHOD TO HANDLE EVENTS USING HISTORICAL DATA IN SERVERLESS SYSTEMS

(71) Applicant: Futurewei Technologies, Inc., Plano, TX (US)

(72) Inventors: Kaveh Shafiee, Bellevue, WA (US); Weijin Xu, Bellevue, WA (US); Ying Xiong, Bellevue, WA (US)

(73) Assignee: Futurewei Technologies, Inc., Plano, TX (US)

(*) Notice: Subject to any disclaimer, the term of this patent is extended or adjusted under 35 U.S.C. 154(b) by 268 days.

(21) Appl. No.: 15/399,687

(22) Filed: Jan. 5, 2017

(65) Prior Publication Data

US 2018/0176070 A1 Jun. 21, 2018

Related U.S. Application Data (60) Provisional application No. 62/435,582, filed on Dec. 16, 2016.

(51) Int. Cl.
*H04L 12/24* (2006.01)
*G06F 9/50* (2006.01)
(Continued)

(52) U.S. Cl.
CPC .......... *H04L 41/069* (2013.01); *G06F 9/5083* (2013.01); *G06F 9/542* (2013.01); *H04L 67/10* (2013.01)

(58) Field of Classification Search
CPC ..... H04L 41/069; H04L 67/10; G06F 9/5083; G06F 9/5077; G06F 9/542
(Continued)

(56) References Cited

U.S. PATENT DOCUMENTS 9,294,236 B1 3/2016 Ward, Jr.
2004/0083481 A1* 4/2004 Shultz ................. G06F 9/45533
719/312
(Continued)

FOREIGN PATENT DOCUMENTS

CN 102460393 A 5/2012
CN 104735102 A 6/2015

OTHER PUBLICATIONS

Service Engineering, Single-Server Service-Station (G/G/1), Jan. 2006, ie.technion.ac.il, http://ie.technion.ac.il/serveng/Lectures/GG1.pdf (Year: 2006).*

(Continued)

*Primary Examiner* — Zi Ye
(74) *Attorney, Agent, or Firm* — Vierra Magen Marcus LLP (57) ABSTRACT

The disclosure relates to technology handling events in a distributed computing environment. Events comprising a function executable by an instance are received from an event queue. The received events are mapped to an instance in a pool that executes a corresponding function. When it is determined that the instances in the pool are at least one of unavailable and do not include the function corresponding to the event, a new instance is created in the pool, where the new instance includes the function corresponding to the event. Instances in the pool may be terminated when frequency of occurrence patterns of the event with a corresponding function indicate the event is occurring less frequently such that fewer instances are required to execute the corresponding function. Otherwise, the events are dispatched to the appropriate instance in the pool for execution.

14 Claims, 9 Drawing Sheets

(51) Int. Cl.
  *G06F 9/54* (2006.01)
  *H04L 29/08* (2006.01)
(58) Field of Classification Search
  USPC .......................................... 709/224; 718/104
  See application file for complete search history.

(56) References Cited

U.S. PATENT DOCUMENTS

| | | |
|---|---|---|
| 2006/0262915 A1 | 11/2006 | Marascio et al. |
| 2011/0239268 A1 | 9/2011 | Sharp et al. |
| 2012/0198451 A1* | 8/2012 | Gupta .................. G06F 9/45558 |
| | | 718/1 |
| 2012/0233668 A1 | 9/2012 | Leafe et al. |
| 2013/0055241 A1* | 2/2013 | De ........................... G06F 8/63 |
| | | 718/1 |
| 2013/0179895 A1* | 7/2013 | Calder .................. G06F 9/5077 |
| | | 718/104 |
| 2013/0185038 A1* | 7/2013 | Radu .................. G06F 11/3447 |
| | | 703/2 |
| 2013/0238785 A1 | 9/2013 | Hawk et al. |
| 2014/0052864 A1 | 2/2014 | Van Der Linden et al. |
| 2014/0181816 A1* | 6/2014 | Muller .................. G06F 9/5022 |
| | | 718/1 |
| 2014/0289412 A1* | 9/2014 | Doddavula ......... H04L 41/5003 |
| | | 709/226 |

OTHER PUBLICATIONS

PCT/CN2017/114650, ISR, Feb. 24, 2018.

\* cited by examiner

SYSTEM AND METHOD TO HANDLE EVENTS USING HISTORICAL DATA IN SERVERLESS SYSTEMS

BACKGROUND

Event processing is a difficult problem in distributed computing. An event is a notification of an occurrence in one part of a system to another part of the system. Events may be generated by several parts of a system, such as a client, and handled by several other components, such as servers in a data center.

To facilitate increased utilization of data center resources, virtualization technologies may allow a single physical computing device to host one or more instances of virtual machines that appear and operate as independent computing devices to clients of the data center. With virtualization, the single physical computing device can create, maintain, delete, or otherwise manage virtual machines in a dynamic manner. Clients can request computer resources from the data center and be provided with virtual machine resources to perform requested events.

BRIEF SUMMARY

In a first embodiment, there is a computer-implemented method for handling events in a distributed computing environment, comprising receiving an event stored in a queue of one or more events, wherein the event comprises a function executable by an instance in a pool of instances; mapping the event to the instance in the pool that is executing a corresponding function, the mapping comprising: in response to determining that the instances in the pool are at least one of unavailable and do not include the function corresponding to the event, creating a new instance in the pool, the new instance including the function corresponding to the event, and terminating one or more of the instances in the pool when frequency of occurrence patterns of the event with a corresponding function indicate the event is occurring less frequently such that fewer instances are required to execute the corresponding function; and dispatching the event to the new instance in the pool for execution on a host server.

In a second embodiment according to the first embodiment, the method further comprising: dispatching the event to an existing instance in the pool in response to determining that the instance in the pool includes the function corresponding to the event.

In a third embodiment according to any one of the first to second embodiments, the method further comprising: requesting a status of the function corresponding to the event from a function data store; and receiving a response from the function data store indicating the status of the one or more instances in the pool having the function corresponding to the event.

In a fourth embodiment according to any one of the first to third embodiments, the status is one of busy and idle.

In a fifth embodiment according to any one of the first to fourth embodiments, the method further comprising: determining a number of instances in the pool as a pool capacity; and allocating a percentage of the pool capacity to each of the functions based on historical event data.

In a sixth embodiment according to any one of the first to fifth embodiments, the frequency of patterns include: an average arrival rate of the functions received from the queue of one or more events, and an average runtime rate received from the pool of instances.

In a seventh embodiment according to any one of the first to sixth embodiments, the frequency patterns are stored as the historical event data and accessible from a historical data store.

In an eighth embodiment according to any one of the first to seventh embodiments, each of the instances are modeled as an G/G/1 queue, with the average arrival rate of the events in the instances and the average runtime rate for each function executed by the instance follow a general distribution.

In a ninth embodiment according to any one of the first to eighth embodiments, the instance includes a resource associated with one or more servers in the distributed computing environment.

In a tenth embodiment, there is a non-transitory computer-readable medium storing computer instructions for handling events in a distributed computing environment, that when executed by one or more processors, perform the steps of: receiving an event stored in a queue of one or more events, wherein the event comprises a function executable by an instance in a pool of instances; mapping the event to the instance in the pool that is executing a corresponding function, the mapping comprising: in response to determining that the instances in the pool are at least one of unavailable and do not include the function corresponding to the event, creating a new instance in the pool, the new instance including the function corresponding to the event, and terminating one or more of the instances in the pool when frequency of occurrence patterns of the event with a corresponding function indicate the event is occurring less frequently such that fewer instances are required to execute the corresponding function; and dispatching the event to the new instance in the pool for execution on a host server.

In an eleventh embodiment, there is a network device for handling events in a distributed computing environment, comprising: a non-transitory memory storage comprising instructions; and one or more processors in communication with the memory, wherein the one or more processors execute the instructions to: receive an event stored in a queue of one or more events, wherein the event comprises a function executable by an instance in a pool of instances; map the event to the instance in the pool that is executing a corresponding function, the mapping comprising: in response to determining that the instances in the pool are at least one of unavailable and do not include the function corresponding to the event, create a new instance in the pool, the new instance including the function corresponding to the event, and terminate one or more of the instances in the pool when frequency of occurrence patterns of the event with a corresponding function indicate the event is occurring less frequently such that fewer instances are required to execute the corresponding function; and dispatch the event to the new instance in the pool for execution on a host server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for handling events in a serverless system. Events are queued into an event queue and distributed (or dispatched) to one or more resources for processing. Resources are maintained in a pool and comprise instances which are responsible for execution of functions that correspond to incoming events. The events are mapped to one or more existing instances based on various factors, including the status of the instances in the pool. When an instance corresponding to the function of the requested event does not exist in the pool, one or more new instances may be created. Additionally, the existing instances in the pool may be terminated and the new instances created based on historical information representing average arrival rates of the events and average runtime rates of functions executing on the instances. Managing the pool of resources that are ready for use as soon as a client request is received reduces delay (latency) associated with executing the event (in the form of user code) and minimizes resource usage such that the resources are available to process incoming events.

It is understood that the present embodiments of the invention may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

Figure 1:
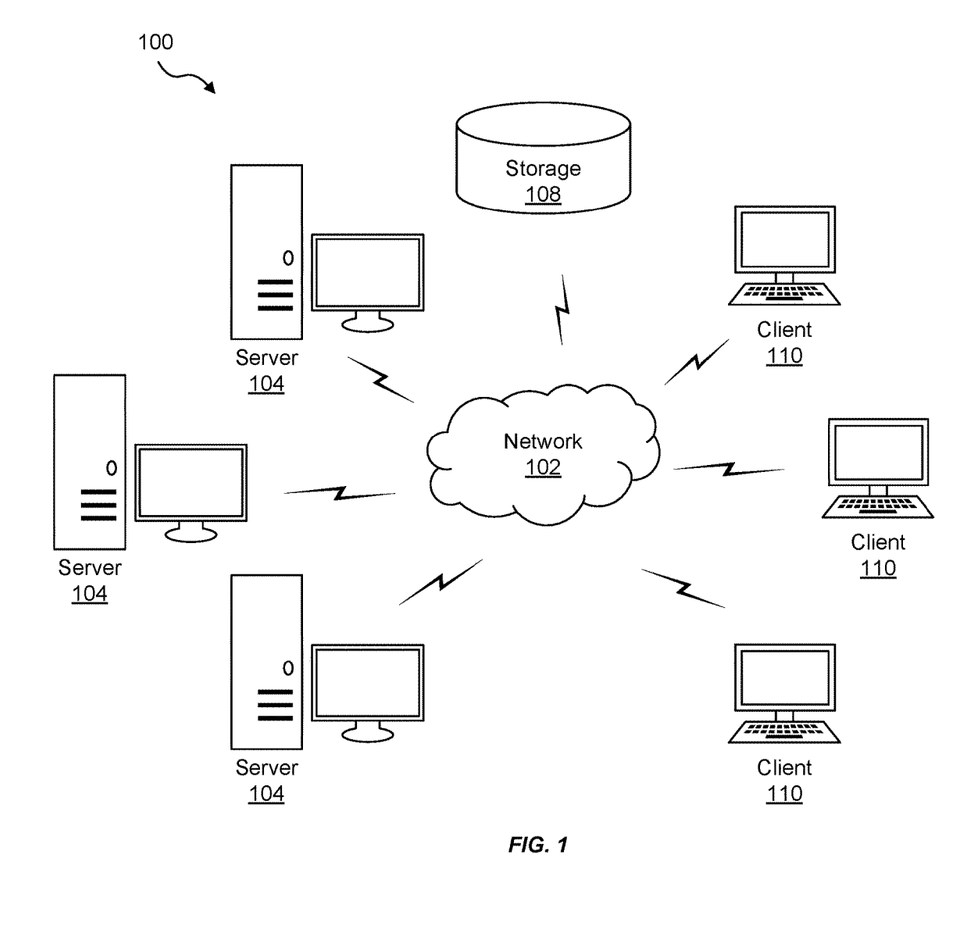
FIG. 1 is an example data processing system in which embodiments of the disclosure may be implemented.

FIG. 1 is an example data processing system in which embodiments of the disclosure may be implemented. The data processing system 100 is a network of computers including, for example, network 102, servers 104, storage 108 and clients 110. While certain numbers of these components or elements are shown in the figure, any number of these components or elements may be included in the system 100.

Network 102 may be any wired network, wireless network, or combination thereof. In addition, the network 102 may be a personal area network, local area network, wide area network, over-the-air broadcast network (e.g., for radio or television), cable network, satellite network, cellular telephone network, or combination thereof. For example, the network 102 may be a publicly accessible network of linked networks, possibly operated by various distinct parties, such as the Internet. In some embodiments, the network 102 may be a private or semi-private network, such as a corporate or university intranet. The network 102 may include one or more wireless networks, such as a Global System for Mobile Communications (GSM) network, a Code Division Multiple Access (CDMA) network, a Long Term Evolution (LTE) network, or any other type of wireless network. The network 102 can also use protocols and components for communicating via the Internet or any of the other aforementioned types of networks.

In the depicted example, servers 104 connect to network 102 along with storage unit 108 and clients 110. The servers 104 may be any network device (or node) that is capable of transmitting or receiving data via a communication channel, such as a router, switch, hub, host network interface, or some other hardware and/or software-based component capable of transmitting and receiving data via network 102.

Clients 110, similar to servers 104, connect to network 102 and storage 108 and may include, but are not limited to, a personal computer (PC), pager, cellular telephone, personal digital assistant (PDA), smartphone, laptop, tablet, touchpad, wireless sensor, or consumer electronics device, for example.

Storage 108 may be a database, memory, data store or storage system or any combination thereof. The storage 108 may store data such as code, metadata associated with the code or any other data utilized by the data processing network 100. For example, each server 104 and/or client 110 may have one or more storage systems either physically (e.g., a local storage resident on the physical computing system) or logically (e.g., a network-attached storage system located internally or externally) associated therewith.

Figure 2:
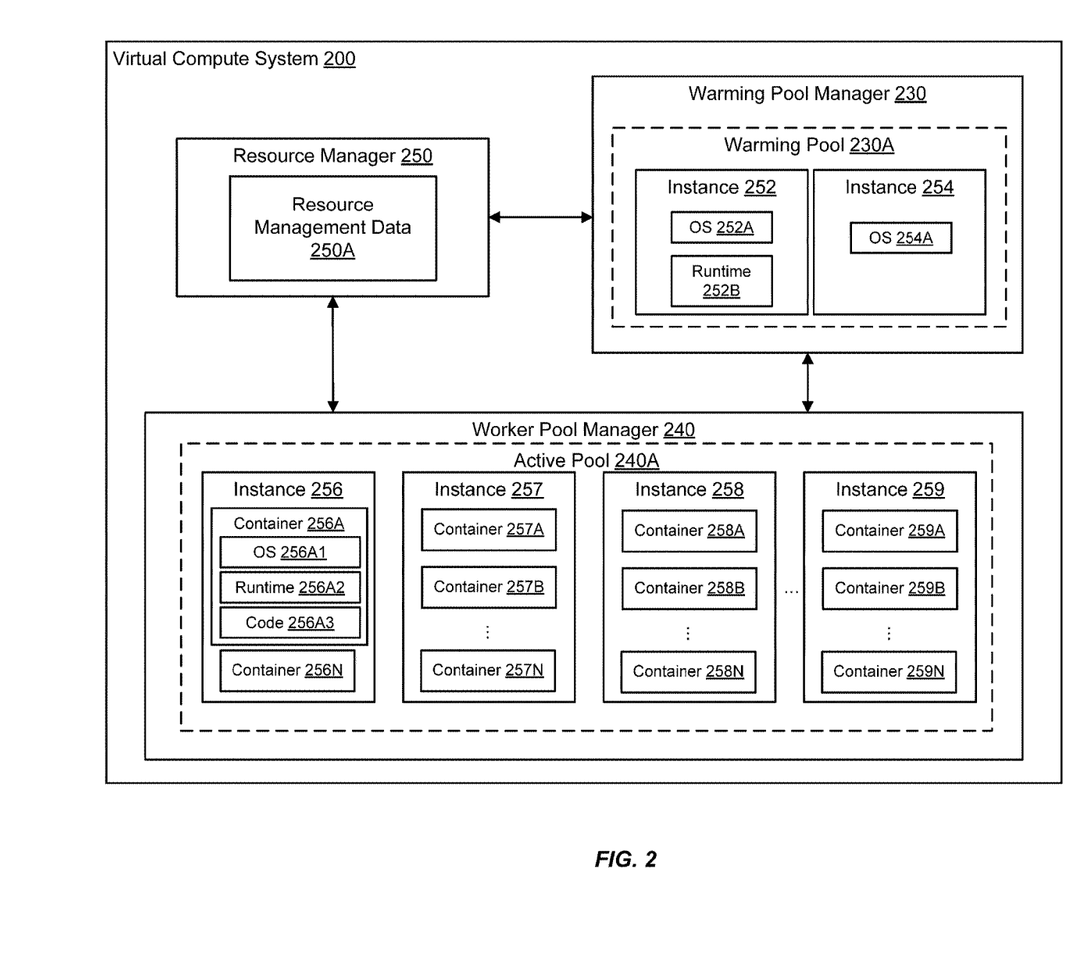
FIG. 2 illustrates an example virtual compute system according to an embodiment.

FIG. 2 illustrates an example virtual compute system 200 according to an embodiment. The virtual compute system 200 operates, for example, in a distributed computing environment, such as the data processing system 100 of FIG. 1, including several computer systems that are interconnected using one or more computer networks. In such an environment, clients (e.g., developers, etc.) may request events (program code) for execution using virtual computing resources provided by the virtual compute system 200. In one embodiment, the virtual compute system 200 is implemented on the servers 104 of FIG. 1.

Clients, such as clients 110, may access such virtual compute system 200 using, for example, network 102 (FIG. 1). Clients 110 may also generate and upload events in the form of program code to the virtual compute system 200, such that the virtual compute system 200 may invoke the program code on instances residing on the virtual compute system 200. Program code may include, for example, submitting a request to execute the event in the form of the program code.

Virtual compute system 200 may include, for example, a warming pool manager 203, a worker pool manager 240, and a resource manager 250. Virtual machine instances ("instances") 252, 254 are shown in a warming pool 230A managed by the warming pool manager 230, and instances 256 to 259 are shown in an active pool 240A managed by the worker pool manager 240. Although the depicted embodiment shows a single virtual compute system 200 with a single warming pool manager 230, worker pool manager 240, resource manager 250, etc., it is appreciated that the virtual compute system 200 may comprise one or more warming pool managers, worker managers, resource managers, etc. Additionally, although six instances are shown, the embodiments described herein are not limited as such, and one skilled in the art will appreciate that the virtual compute system 200 may comprise any number of instances implemented using any number of physical computing devices.

The virtual compute system 200 may be implemented in hardware and/or software and may, for example, include one or more physical or virtual servers implemented on physical computer hardware configured to execute computer executable instructions for performing various features that will be described herein. The one or more servers may be geographically dispersed or geographically co-located, for example, in one or more data centers or data processing systems.

The warming pool manager 230 ensures that virtual machine instances are ready to be used by the worker pool manager 240 when the virtual compute system 200 receives a request to execute client events, for example as one or more functions, on the virtual compute system 200. In the diagram, the warming pool manager 230 manages the warming pool 230A, which is a group of pre-initialized and pre-configured virtual machine instances that may be used to service incoming events.

The instances 252 and 254 may have operating systems (OS) and/or language runtimes loaded thereon. For example, the warming pool 230A managed by the warming pool manager 230 comprises instances 252 and 254. The instance 252 and 254 include an OS 252A and/or a runtime 252B. In some embodiments, the virtual machine instances in the warming pool 230A may be used to serve events requested by a client 110. The instances in the warming pool 230A may be configured in the same or substantially similar manner or differently to suit the functions of various incoming events and corresponding functions.

The worker pool manager 240 also manages the instances used for servicing incoming events. For example, the worker pool manager 240 manages the active pool 240A, which is a group of virtual machine instances 256 to 259 that are currently assigned to one or more events of one or more clients 110.

Each of the instances 256 to 259 include containers 256A to 256N, 257A to 257N, 258A to 258N and 259A to 259N that are logical units created within an instance using the resources available on that instance. The container 256A has OS 256A1, runtime 256A2 and code 256A3 loaded therein. Container 256N may also include an OS, runtime and code. Containers 257A-N, 258A-N and 259A-N may be loaded similarly. In one example, the instances are empty space or partially empty space that may be used to create new instances and/or containers.

The worker pool manager 240 may create a new container or locate an existing container in one of the instances in the active pool 240A and assigns the container to the request (e.g., event request) to handle execution of the client code (event) and corresponding function associated with the request. Execution of the request will be discussed in more detail below with reference to FIGS. 3-5.

When a client 110 submits a request, the worker pool manager 240 finds capacity to service the request to execute the event on the virtual compute system 200. For example, if there exists a particular virtual machine instance in the active pool 240A that has a container with the same functionality loaded therein (e.g., code 256A3 shown in the container 256A), the worker pool manager 240 may assign the container to the request and cause the event to be executed in the container. Alternatively, if the event is available in the local cache of one of the virtual machine instances (e.g., stored on the instance 258 but not belonging to any individual containers), the worker pool manager 240 may create a new container on such an instance, assign the container to the request, and cause the event to be loaded and executed in the container.

If the worker pool manager 240 determines that the event associated with the request is not found on any of the instances (e.g., either in a container or the local cache of an instance) in the active pool 240A, the worker pool manager 240 may determine whether any of the instances in the active pool 240A are currently assigned to the client 110 associated with the request and that have compute capacity to handle the current request. If there is such an instance, the worker pool manager 240 may create a new container on the instance and assign the container to the request. Alternatively, the worker pool manager 240 may further configure an existing container on the instance assigned to the client 110, and assign the container to the request.

If the active pool 240A does not contain any instances currently assigned to the client 110, the worker pool manager 240 may pull a new virtual machine instance from the warming pool 230A, assign the instance to the user associated with the request, create a new container on the instance, assign the container to the request, and cause the event to be downloaded and executed on the container.

Once the worker pool manager 240 locates one of the virtual machine instances in the warming pool 230A that can be used to serve the event request, the warming pool manager 230 or the worker pool manager 240 takes the instance out of the warming pool 230A and assigns it to the user associated with the request. The assigned virtual machine instance is taken out of the warming pool 230A and placed in the active pool 240A.

The resource manager 250 manages the amount of resources allocated for processing incoming requests to execute events and corresponding functions on the virtual compute system 200. For example, the resource manager 250 may communicate with the warming pool manager 230 and the worker pool manager 240 to monitor and manage the compute capacity allocated to (and used by) the various events executed on the virtual compute system 200. The resource manager 250 includes resource management data 250A that may include, for example, data regarding the history of incoming requests and status of instances of the program code being executed on the virtual compute system 200.

As discussed above, the request itself may specify the amount of computing resources (e.g., memory, CPU, storage, network packets, etc.) to be used for executing the program code associated with the request. After such a request has been processed and a virtual machine instance has been assigned to the client 110 associated with the request, the resource manager 250 may allocate the amount of resources specified in the request to the request by creating a container for the same amount of resources.

Figure 3:
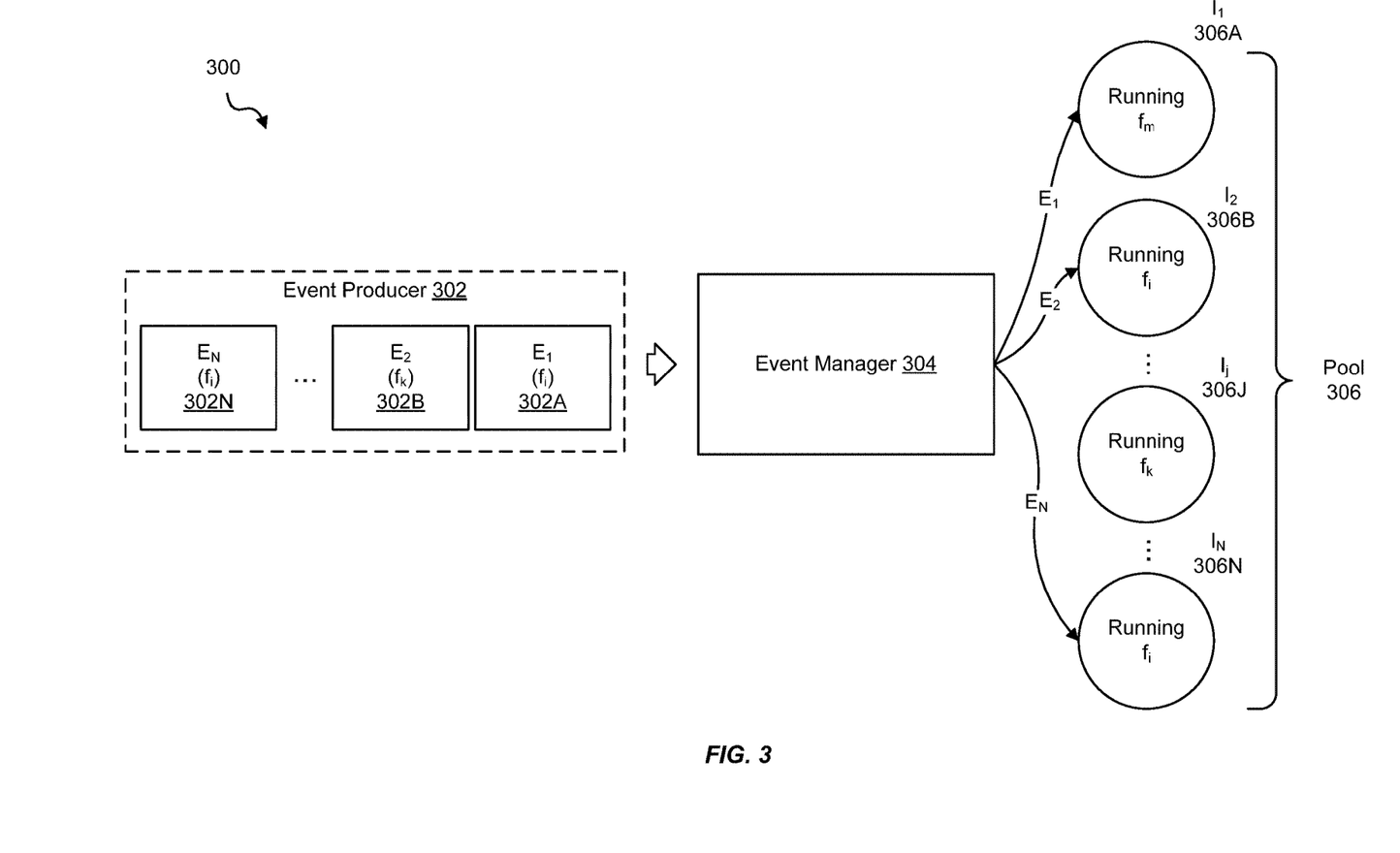
FIG. 3 illustrates a serverless system in which events are mapped to instances of a pool.

FIG. 3 illustrates a serverless system in which events are mapped to instances of a pool. The serverless system 300 includes, but is not limited to, an event producer 302, an event manager 304 and a pool 308 including multiple instances $I_1$ 306A to $I_N$ 306N. As explained above, clients or users produce requests (events) with a corresponding function. In the discussion that follows, any one or more of the clients or users may also be referred to herein as an event producer 302.

Events $E_1$ 302A to $E_N$ 302N are queued in an event queue (FIG. 4) until each of the events $E_1$ 302A to $E_N$ 302N can be mapped by event manager 304 to a respective instance $I_1$ 306A to $I_N$ 306N for execution. In one embodiment, the instances $I_1$ 306A to $I_N$ 306N are responsible for executing one or more functions $f_m$, $f_i$, $f_k$, $f_i$ associated with an incoming event $I_1$ 306A to $I_N$ 306N.

In one embodiment, instances $I_1$ 306A to $I_N$ 306N are maintained in a pool 306, which may be managed by a host (not shown) and comprise a number of instance host platforms that can each accommodate one or more instances of various types, such as virtualized compute server 200. The number of instance hosts included within a pool 306 may be determined based on various factors such as the infrastructure constraints or the demand for various types of resource instances.

Event manager 304 is responsible for scheduling (mapping) events $E_1$ 302A to $E_N$ 302N received from the event producer 302 via the event queue. In one embodiment, the event manager 304 is or is similar to resource manager 250.

In one embodiment, upon receipt of an event $E_1$ 302A to $E_N$ 302N, the event manager 304 parses (e.g., extracts event-type information from event metadata) the incoming events $E_1$ 302A to $E_N$ 302N and generates work items or jobs (not shown). The event-type is, for example, a classification of the event used to determine how to process the event, whereas the metadata is a set of more general and loosely structured properties that can be used to dispatch the event $E_1$ 302A to $E_N$ 302N or be passed on to a specific instance.

In one embodiment, work items are placed in a work queue of the event manager 304. Any one event $E_1$ 302A to $E_N$ 302N may generate one or more work items, where each work item is classified as a single work-type and requires an action to be performed by an instance.

In one embodiment, each of the instances $I_1$ 306A to $I_N$ 306N include an agent (FIG. 4) capable of performing one or more work types. When a work item of the appropriate work-type is available in the work queue, this work item will be assigned to a corresponding agent. When the agent 313 completes processing the one or more work types (successfully or unsuccessfully), the work item will be marked as complete and reported back to the event manager 304.

Figure 4:
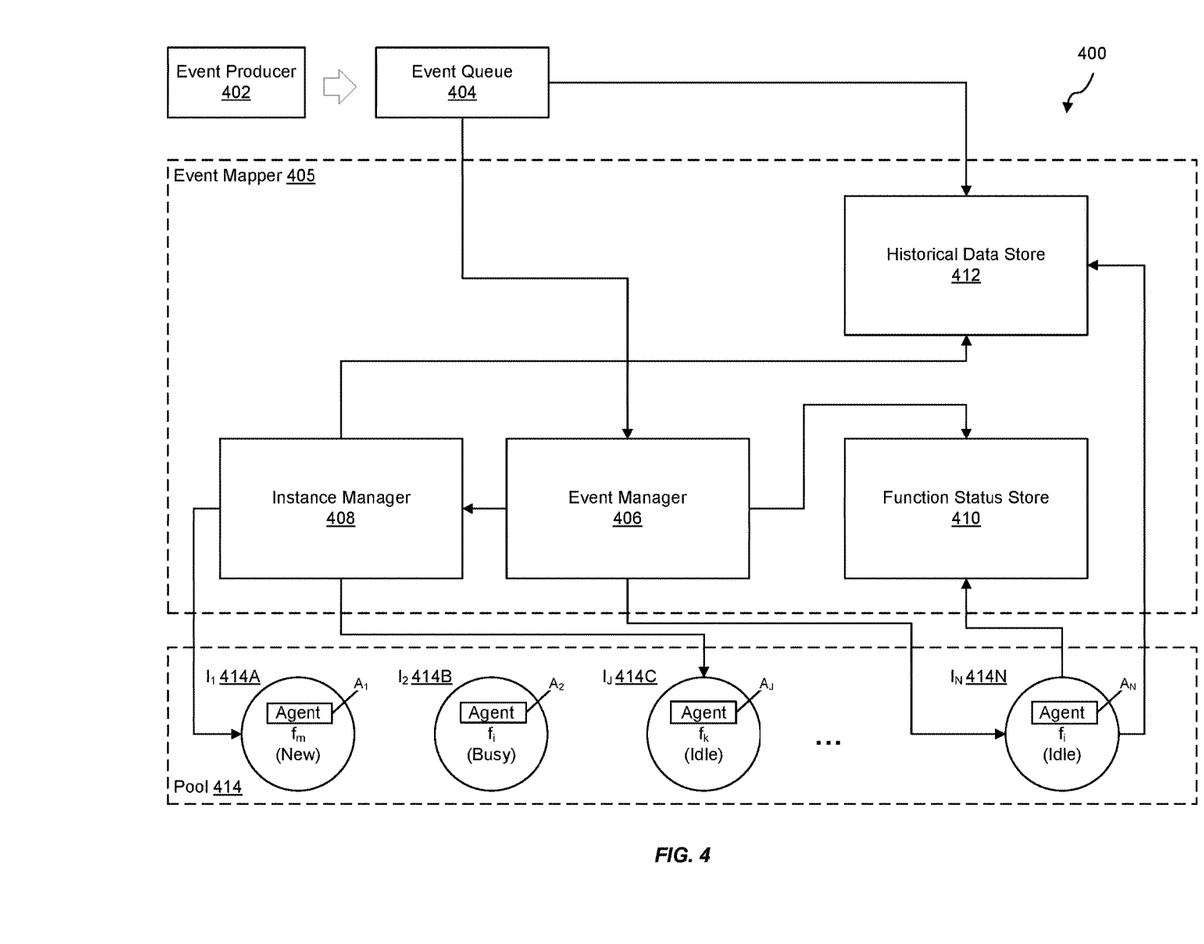
FIG. 4 illustrates an example system for mapping events in accordance with the disclosure.

FIG. 4 illustrates an example system for mapping events in accordance with the disclosure. The system 400 may be part of a larger network, such as the data processing network 100 descried in FIG. 1, that provides a mechanism in which to optimize instance caching using historical data such that initiation delays and resource usage are minimized.

As depicted, the system 400 includes, but is not limited to, an event producer 402 that sends events $E_1$ 302A to $E_N$ 302N for queueing to an event queue 404, and event mapper 405 responsible for mapping the events, and a pool 414 of instances $I_1$ 414A to $I_N$ 414N that execute functions corresponding to the events $E_1$ 302A to $E_N$ 302N. In one embodiment, the pool 414 may be warming pool 230A or active pool 240A (FIG. 2) or pool 306 (FIG. 3), or any combination thereof.

Event mapper 405 includes, for example, event manager 406, instance manager 408, a function status store 410 and a historical data store 412. The event mapper 405 is generally responsible for pool management functionality, such as creating instances, terminating instances and scheduling events. The event mapper 405 also is responsible for managing and/or storing historical data from the event queue 404 as well as related status information about the instances and corresponding functions executed thereon. With reliance on the historical data and status information, in one embodiment, the event mapper 405 schedules and maps events $E_1$ 302A to $E_N$ 302N to instances $I_1$ 414A to $I_N$ 414N in pool 414.

Event queue 404 stores each of the events $E_1$ 302A to $E_N$ 302N which may processed by event manager 406 and instance manager 408 as instances with a corresponding function become available in the pool 414.

In one embodiment, the event manager 406 functions similar to the event manager 304 described with reference to FIG. 3. In another embodiment, the event manager 406 queries the function status store 410 to determine whether an instance $I_1$ 414A to $I_N$ 414N with a function $f_m$, $f_i$, $f_k$, $f_n$, etc. corresponding to the incoming event exists in the pool 414. Based on this determination, the event manager 404 either schedules and dispatches the event to an instance in the pool 414, or consults the instance manager 408. A more detailed description of the event manager 404 will be provided with reference to FIG. 5 below.

Instance manager 408, in conjunction with event manager 406, may be responsible for orchestrating configuration operations in response to client requests, for responding to unexpected instance shutdowns, and/or for registering new instance hosts. For example, in response to a client request to initiate a particular instance $I_1$ 414A to $I_N$ 414N (for example, based on the event and associated functionality), the instance manager 408 may identify exactly which instance host is to be used for executing the requested event. The instance manager 408 will be described in more detail with reference to FIG. 6 below.

Function status store 410 stores the status of instances $I_1$ 414A to $I_N$ 414N and their associated functions $f_m$, $f_i$, $f_k$. The status may be maintained, for example, in local cache of one or more instance hosts or independently in storage (for example, storage 108) and identify whether a particular instances is new, busy, idle, etc. For example, as shown in pool 414, there are four instances $I_1$ 414A, $1_2$ 414B, $1_f$ 414C to $I_N$ 414N with respective functions $f_m$, $f_i$, $f_k$ and $f_i$, each having a status associated therewith. This may be represented and stored in the function status store 410 as ($I_k$, $f_j$, status), where I is the $k^{th}$ instance, f is the $j^{th}$ function and status is new, busy, idle, etc.

Historical data store 412 stores information about a function's ($f_j$) average arrival rate ($\lambda_j$) and average runtime rate ($\mu_j$). Similar to the function status store 410, the arrival rate and average runtime rate of the functions may be stored in local cache of one or more instance hosts or independently in storage, such as storage 108. As events arrive into the system, the average arrival rate may be calculated. Additionally, execution times of the functions being executed on the various instances may also be stored.

In one embodiment, the arrival process is defined as how events arrive (e.g., individually or in groups (batch or bulk arrivals)), how the arrivals are distributed in time (e.g., what is the probability distribution of time between successive arrivals (the inter-arrival time distribution)), and whether there is a finite population of events or (effectively) an infinite number.

Another form of measuring the arrival rate is using a Poisson stream of arrivals. In this case, arrival of the events occur at random. In a Poisson stream, successive events arrive after intervals which independently are exponentially distributed. Other arrival processes include, but are not limited to, scheduled arrivals, batch arrivals and time dependent arrival rates (i.e. the arrival rate varies according to the time of day).

The average runtime rate (or service time distribution) is typically independent of the arrival process and often exponentially distributed. In one embodiment, the average runtime rate may be defined by factors such as the number resources needed for service to begin, how long the service will take, the number of servers available, whether the servers are in series (each server has a separate queue) or in parallel (one queue for all servers), and whether preemption is allowed (a server can stop processing one event to deal with another "higher-level" event).

Pool 414 is similar to the pools described above with reference to FIGS. 2 and 3. The pool 414 is a set of resources (such as an instance host or host server) that are maintained and ready to use, rather than acquired on use and released afterwards. A client, such as client 110, requests a resource (containing the instance) from the pool 414 and performs desired operations (associated with the event and corresponding function). When the client 110 finishes with the resource, it is returned to the pool 414 rather than released. In one embodiment, the pool 414 is active pool 240A. In another embodiment, the pool 414 is warming pool 230A.

As illustrated in the depicted embodiment, instances $I_1$ 414A to $I_N$ 414N each include a respective agent $A_1$ to $A_N$. Each agent $A_1$ to $A_N$ is capable of performing one or more work types, and is instructed by the event manager 406 and/or instance manager 408 to perform work. In one embodiment, agents $A_1$ to $A_N$ may also request work from the event manager 406 and/or instance manager 408. Agents $A_1$ to $A_N$ may also be responsible for reporting the success or failure of a particular action. For example, when work is completed by a particular instance $I_1$ 414A to $I_N$ 414N, the agent $A_1$ to $A_N$ will report the status (e.g., success or failure) to the function status store 410 and/or historical data store 412. The agents $A_1$ to $A_N$ may also communicate the average runtime rate (e.g.; how long a process takes to run) and the current status of the instance $I_1$ 414A to $I_N$ 414N upon completion of processing (e.g., busy, idle, etc.). When new instances are created, agents $A_1$ to $A_N$ may similarly report such creation to the function status store 410 and/or historical data store 412.

Figure 5:
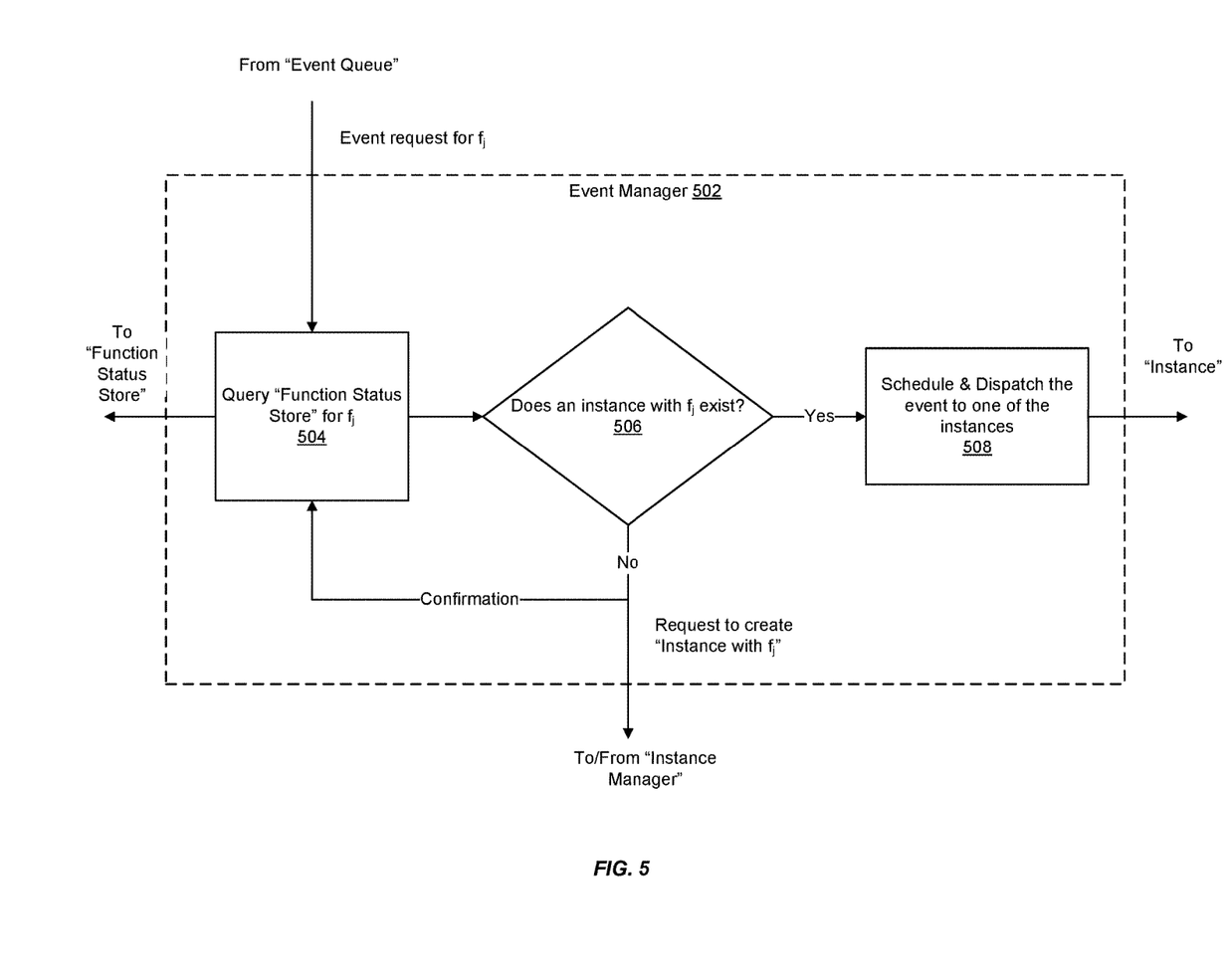
FIG. 5 illustrates an example embodiment of the functionality of the event manager.

FIG. 5 illustrates an example embodiment of the functionality of the event manager. In the description that follows, the event manager 502 resides on one or more virtual compute systems, such as virtual compute system 200, and may be, for example, resource manager 250 (depicted in FIG. 2). In another example, the event manager 502 may be warming pool manager 203 or worker pool manager 240. However, it is appreciated that the event manager 502 is not limited to such an embodiment, and may be any combination of hardware and/or software that is executable by a component of the system 100 capable of performing such actions.

The event manager 502 receives an incoming event from the event queue 404 (or directly from event producer 402), and queries the function status store 410 for the status of instances $I_1$ 414A to $I_N$ 414N in the pool 414 that have a corresponding function $f_j$ at 504.

At 506, the event manager 502 determines whether an instance $I_1$ 414A to $I_N$ 414N in pool 414 exists with a corresponding function $f_j$. In one embodiment, this is accomplished by the event manager 502 communicating with the warming pool manager 230 and/or worker pool manager 240. In another embodiment, this is accomplished by the event manager 502 communicating with the warming pool 230A and/or active pool 240A directly.

If the event manager 502 determines that an instance $I_1$ 414A to $I_N$ 414N with function $f_j$ exists, then the event is scheduled and dispatched to the respective instance(s) $I_1$ 414A to $I_N$ at 508. Otherwise, the event manager 502 requests that the instance manager 408 create a new instance in the pool 414, and reports any status updates to the function status store 410. For example, instance $I_1$ 414A has a corresponding function $f_m$ that has been newly created in the pool 414 to execute the function of the incoming event. Once the new instance $I_1$ 414A has been created, a confirmation is sent to the function status store 410 to reflect creation of the new instance.

Figure 6:
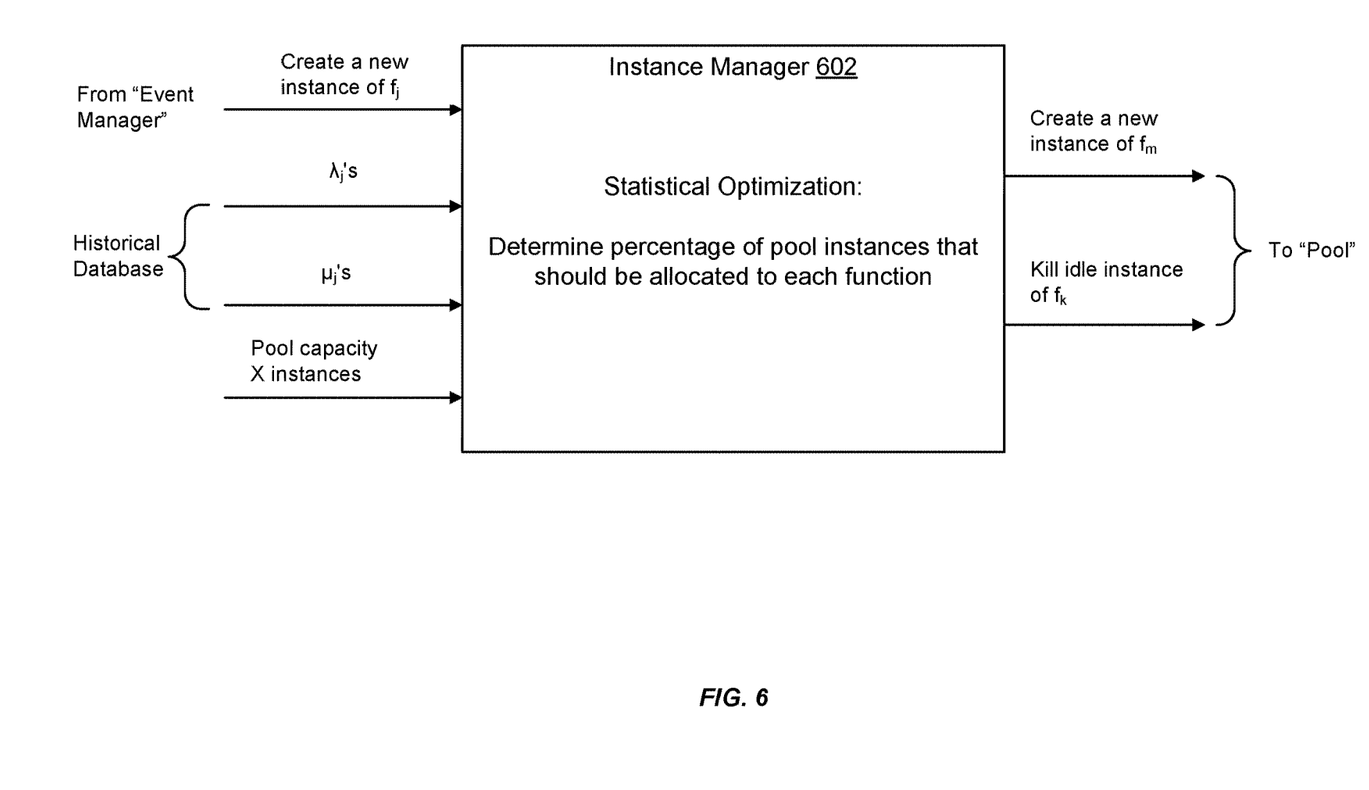
FIG. 6 illustrates an example embodiment of the functionality of the instance manager.

FIG. 6 illustrates an example embodiment of the functionality of the instance manager. In the description that follows, the instance manager 602 may be an instance host or server as described above. However, it is appreciated that the instance manager 602 is not limited to such an embodiment, and may be any combination of hardware and/or software that is executable by a component of the system 100 capable of performing such actions.

The instance manager 602 is generally responsible for determining the percentage of the pool 414 of instances that should be allocated to each function in order to optimize instance usage. This may be accomplished using a distribution model, such as normal (or Gaussian) distribution, Poisson distribution, and the like (an example of which is described below with reference to FIG. 7).

As input, the instance manager 602 may receive any one or more of the following: a request to create a new instance with function $f_j$ from the event manager 502; historical information, such as average arrival rate $\lambda$ and average runtime rate $\mu$ from historical data store 412; and pool capacity of the X number of instances. Using the input to determine the percentage of pool instances that should be allocated to each function, the instance manager 602 outputs a command to create a new instance(s) $I_1$ 414A to $I_N$ 414N and/or terminate existing instances $I_1$ 414A to $I_N$ 414N in the pool 414, as described above in more detail.

In one embodiment, the instance manager 602 applies a normal distribution to statistically optimize the allocation of instances and corresponding functions. In its most general form, averages of random variables independently drawn from independent distributions converge in distribution to the normal. That is, they become normally distributed when the number of random variables is sufficiently large. As appreciated, many permutations of distribution exists, any of which may be applied herein.

Figure 7:
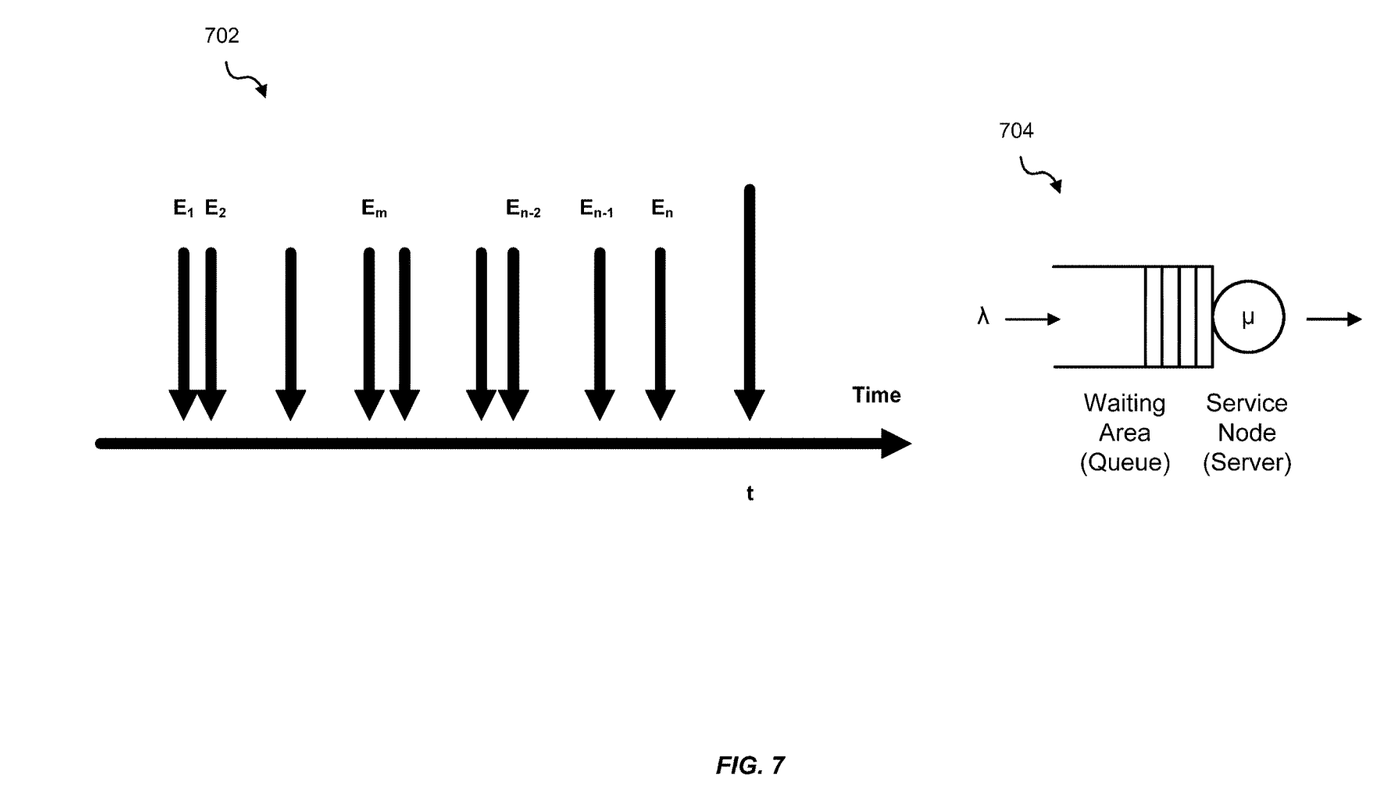
FIG. 7 illustrates an example embodiment of statistical optimization employed by the instance manager.

FIG. 7 illustrates an example embodiment of statistical optimization employed by the instance manager. As illustrated, reference number 702 represents a time line of events $E_1$ to $E_N$ received by an event producer, such as event producer 402. Reference number 704 represents a queue in which servers are represented by circles, queues by a series of rectangles and the routing network by arrows. As noted above, $\lambda$ is the number of arrivals per time period, i.e. the average arrival rate, and $\mu$ is the mean (or average) number of events served per time period, i.e. the average runtime rate.

A standard notation system is employed to classify queueing systems as A/B/C/D/E, where: A represents the probability distribution for the arrival process, B represents the probability distribution for the service process, C represents the number of channels (servers), D represents the maximum number of customers allowed in the queueing system (either being served or waiting for service), and E represents the maximum number of customers in total. D and E are assumed to be infinite when not otherwise specified. Common options for A and B include: M for a Poisson arrival distribution (exponential inter-arrival distribution) or an exponential service time distribution, D for a deterministic or constant value and G for a general distribution (but with a known mean and variance).

In the non-limiting example of FIG. 7 (simplified for purposes of discussion), the M/M/1 queueing system has a Poisson arrival distribution, an exponential service time distribution and a single channel (one server). In the example, suppose we have a single server and events arrive with a Poisson arrival distribution at a mean rate of $\lambda=0.5$ events per millisecond (ms), i.e. on average one event appears every $1/\lambda=1/0.5=2$ ms. This implies that the inter-arrival times have an exponential distribution with an average inter-arrival time of 2 ms. The server has an exponential service time distribution with a mean service rate of 4 events per ms, i.e. the service rate p=4 events per ms. As we have a Poisson arrival rate/exponential service time/single server we have a M/M/1 queue in terms of the standard notation.

Applying the inputs to the instance manager 602 of FIG. 6, we have an average arrival rate of $\lambda_j$, an average runtime rate of $\mu_j$, an expected number of requests for function $f_j$, $N_j$ (number of instances) such that $N_j=\lambda_j/\mu_j$. In order to have zero wait time in the waiting area (queue), $N_j$ instances with $f_j$ functions are required. When a capacity of X instances exists, $N_j$ is normalized. If the normalized $N_j$ is depicted with $N_{j0}$, then $N_{j0}$ is calculated using the equation $N_{j0}=(N_j \times X)/(\Sigma N_i)$.

Figure 8:
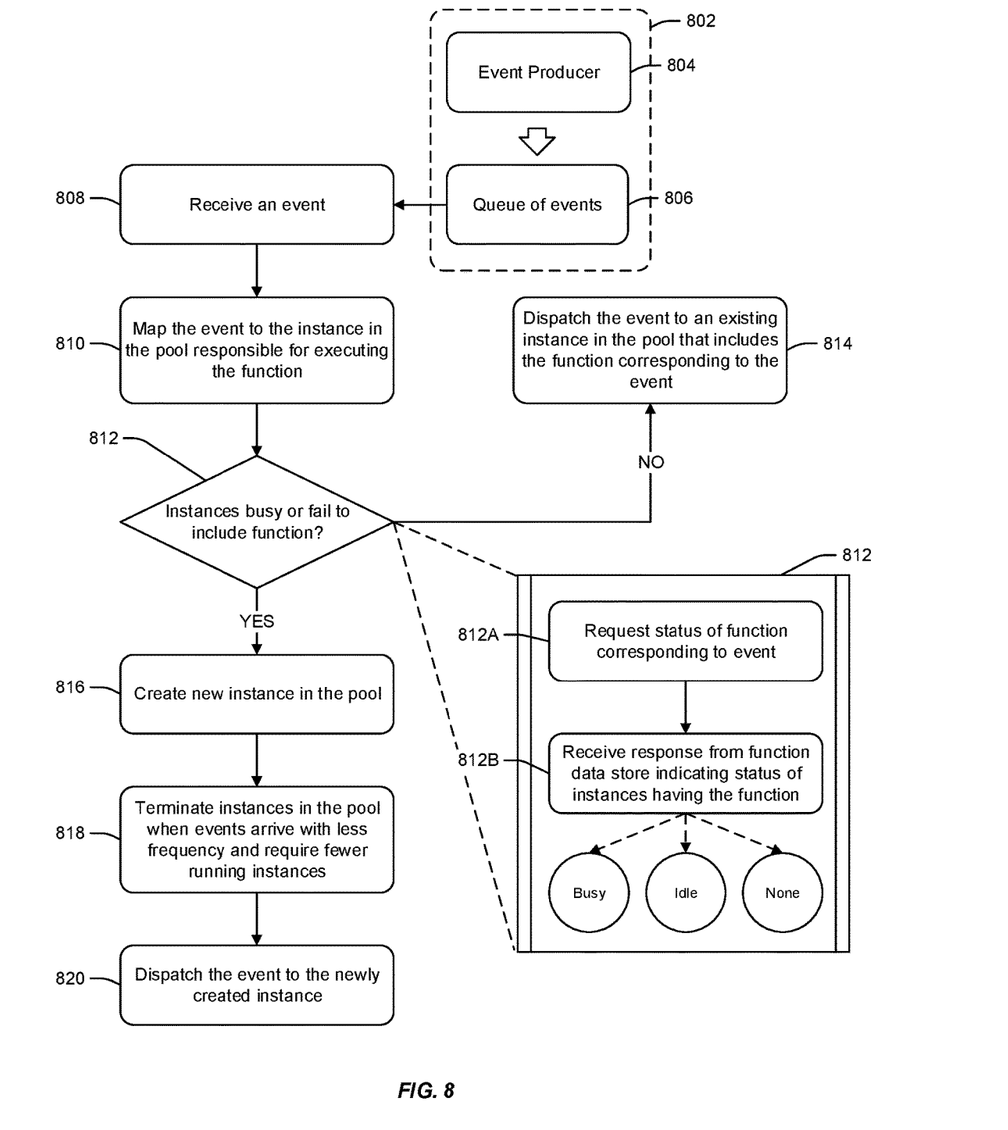
FIG. 8 illustrates a flow diagram of the methodology in accordance with the disclosure.

FIG. 8 illustrates a flow diagram of the methodology in accordance with the disclosure. In the description that follows, the event mapper 405 implements the methodology by processing events received from the event producer 402 and/or event queue 404. However, it is appreciated that implementation is not limited to the event mapper, and that any system hardware and/or software may be responsible for implementation of the methodology.

At 804, the event producer 402 generates events $E_1$ to $E_N$ that are queued into event queue 404 at 806. As illustrated, generation of events by the event producer 402 and queueing of the events into the event queue 404 together represent input (as represented by dashed lines 802) to the event mapper 405. While depicted together, it is appreciated that the event producer 402 and event queue 404 may also reside separately from one another. In one embodiment, the event queue 404 queues events from multiple event producers 402 that may be located anywhere within or outside of the network 100.

Events are received by the event queue 404 at 808 by the event manager 502. With reference to FIG. 7, events may be received from the event queue 404 at the event manager 406 and/or historical data store 412 of the event mapper 405.

At 810, the event mapper 405 maps events $E_1$ to $E_N$ to the instances $I_1$ 414A to $I_N$ 414N in the pool 414 that is executing a corresponding function. To map events $E_1$ to $E_N$ to instances $I_1$ 414A to $I_N$ 414N in the pool 414, the event mapper 405 determines whether instances $I_1$ 414A to $I_N$ 414N in the pool 414 are busy (unavailable) or do not include a function that corresponds to the function of the event at 812. For example, with reference to FIG. 4, if the incoming event $E_N$ has a corresponding function $f_k$, then the event mapper 405 (via event manager 406) searches pool 414 to determine any of the instances $I_1$ 414A to $I_N$ 414N have a corresponding function $f_k$. In the example of FIG. 4, $I_J$ 414N has a corresponding function $f_k$ to which the event $E_N$ may be assigned.

In response to the event mapper 405 determining that one or more instances $I_1$ 414A to $I_N$ 414N with the corresponding function exist (i.e., the instances are not busy or fail to include the function) in the pool 414, the event $E_N$ is dispatched to an existing instance (e.g., host server) $I_1$ 414A to $I_N$ 414N in the pool 414 that includes the corresponding function for execution at 814. In the example of FIG. 4, event $E_N$ is dispatched to instance $I_J$ 414N. For example, an idle instance $I_J$ 414N may keep the instance running to use it to service additional requests from the same or another client. Accordingly, delay is eliminated with not having to create a new container and load the event.

At 812, in response to the event mapper 405 determining that one or more instances $I_1$ 414A to $I_N$ 414N with the corresponding function do not exist in the pool 414 (i.e., the instances are busy or fail to include the function), a new instance $I_1$ 414A including the function $f_m$ corresponding to the event $E_N$ is created in the pool 414 at 816. The event $E_N$ may then be dispatched to the new instance in the pool 414 for execution at 820.

Instances $I_1$ 414A to $I_N$ 414N in the pool 414 may also be terminated by the event mapper 405 at 818. In one embodiment, one or more of the instances $I_1$ 414A to $I_N$ 414N in the pool 414 are terminated when a frequency of occurrence patterns of the event $E_N$ with a corresponding function indicate the event is occurring less frequently, thereby requiring fewer instances to execute the corresponding function. In other embodiments, after the function has been executed on an instance $I_1$ 414A to $I_N$ 414N, the instance $I_1$ 414A to $I_N$ 414N used to execute the function may be terminated to free up the resources it occupied to be used by other events.

In one embodiment, the determination of whether to keep an instance running after the event $E_N$ is done executing may be based on a threshold time, the type of the user and/or other operating conditions. For example, after a threshold time has passed (e.g., 5 minutes) without any activity (e.g., running of the event), the instance is shutdown (e.g., deleted, terminated, etc.), and resources allocated thereto are released.

Determining whether an instance $I_1$ 414A to $I_N$ 414N is busy or fails to include a particular function, in one embodiment, may be accomplished by accessing the function status store 410. The function status store 410, as indicated above, stores the status of instances $I_1$ 414A to $I_N$ 414N and their associated functions $f_m$, $f_i$, $f_k$. The event mapper 405 may request the status of a function corresponding to a requested event at 812A. For example, the event manager 406 may query the function status store 410 to determine whether a particular function is executing on any of the instances $I_1$ 414A to $I_N$ 414N in the pool 414.

At 812B, the event mapper 405 receives a response from the function status store 410 indicating the status of instances $I_1$ 414A to $I_N$ 414N having the function. For example, the function status store 410 may return a value indicating that instance $I_N$ 414N has function $f_i$ and is busy, idle or does not exist (none).

Figure 9:
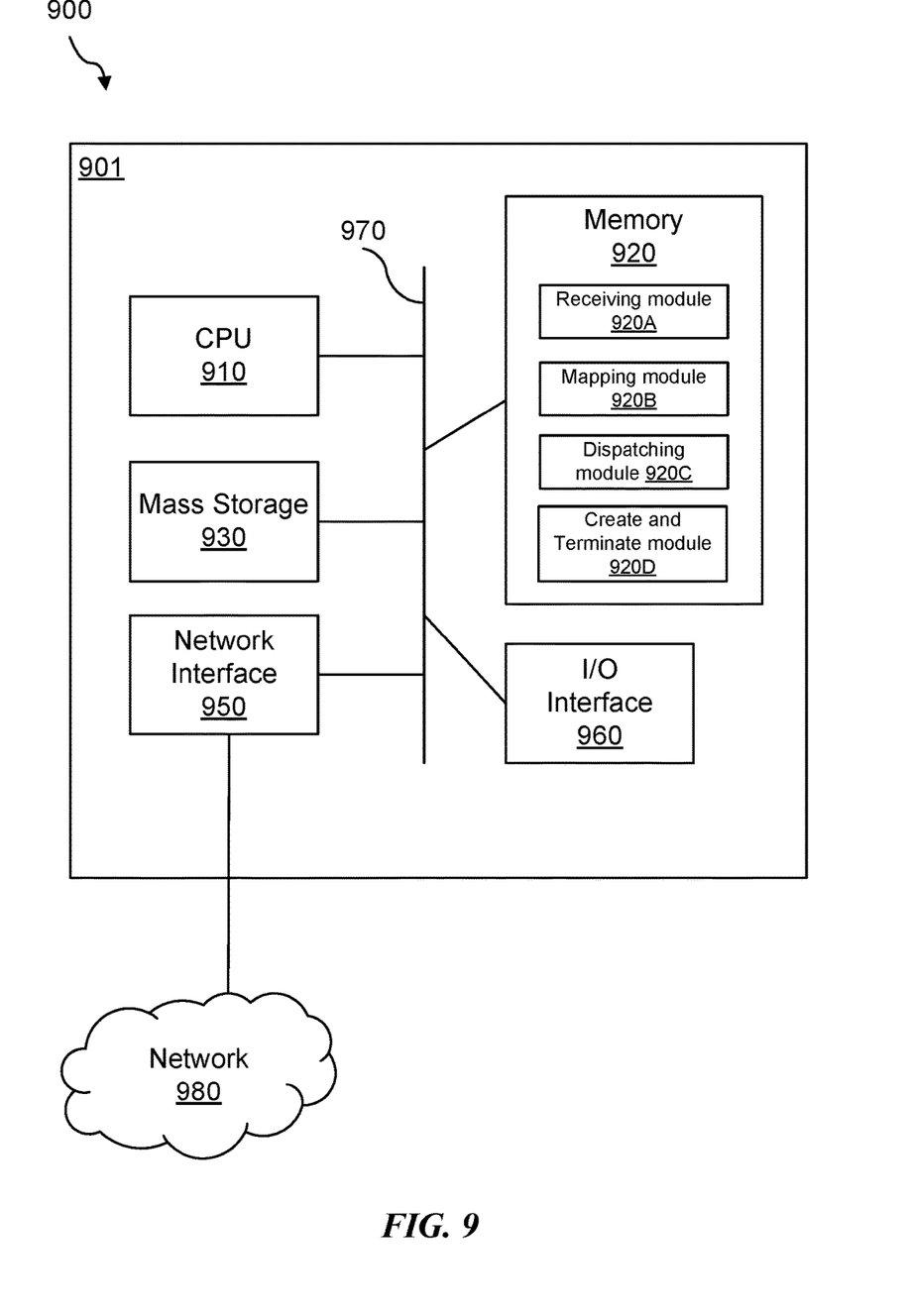
FIG. 9 illustrates a block diagram of a network system that can be used to implement various embodiments.

FIG. 9 is a block diagram of a network device 900 that can be used to implement various embodiments. Specific network devices 900 may utilize all of the components shown, or only a subset of the components, and levels of integration may vary from device to device. Furthermore, the network device 900 may contain multiple instances of a component, such as multiple processing units, processors, memories, transmitters, receivers, etc. The network device 900 may comprise a processing unit 901 equipped with one or more input/output devices, such as network interfaces, storage interfaces, and the like. The processing unit 901 may include a central processing unit (CPU) 910, a memory 920, a mass storage device 930, and an I/O interface 960 connected to a bus 970. The bus 970 may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. In one embodiment, the memory 920 includes a receiving module 920A to receive events, a mapping module 920B to map events to one or more instances, a dispatching module 920C to dispatch an event to an instance, and a create and terminate module 920D that creates and terminates instances in the pool.

The mass storage device 930 may comprise any type of storage device configured to store data, programs, and other information and to make the data, programs, and other information accessible via the bus 970. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

In some embodiments, the network device 900 handling events includes a non-transitory memory storage 920 comprising instructions and one or more processors 910 in communication with the memory 920. The one or more processors 910 execute the instructions to receive an event stored in a queue of one or more events, wherein the event comprises a function executable by an instance in a pool of instances; map the event to the instance in the pool that is executing a corresponding function, the mapping comprising: in response to determining that the instances in the pool are at least one of unavailable and do not include the function corresponding to the event, create a new instance in the pool, the new instance including the function corresponding to the event, and terminate one or more of the instances in the pool when frequency of occurrence patterns of the event with a corresponding function indicate the event is occurring less frequently such that fewer instances are required to execute the corresponding function; and dispatch the event to the new instance in the pool for execution on a host server.

There are many benefits to using embodiments of the present disclosure. For example, in the disclosed technology for handling events, the latency-resource usage trade-off in serverless systems is reduced by optimizing initiating delays and resource usage, applying an architecture to enable optimization of instance cache using historical data, using historical event data to decide whether to destroy or to keep alive instances in the pool, optimizing workloads with Poisson distribution, which is one of the frequently reported patterns in serverless systems.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for handling events in a distributed computing environment, comprising:
    receiving an event stored in a queue of one or more events, wherein the event comprises a function executable by an instance in a pool of instances and a number of instances in the pool defines a pool capacity;
    allocating a percentage of the pool capacity to each of the functions using a distribution model based on a historical frequency of occurrence patterns for the one or more events, the historical frequency of occurrence patterns including an average arrival rate of the functions received from the queue of one or more events and an average runtime rate for each function executed by the instance received from the pool of instances;
    mapping the event to the instance in the pool that is executing a corresponding function, the mapping comprising:
        requesting a status of the function corresponding to the event from a function data store, wherein the function status store stores the status of instances and instance associated functions;
        receiving a response from the function data store indicating the status of the one or more instances in the pool having the function corresponding to the event;
        in response to determining that the instances in the pool are at least one of unavailable and do not include the function corresponding to the event,
            creating a new instance in the pool, the new instance including the function corresponding to the event, and
            terminating one or more of the instances in the pool when the frequency of occurrence patterns of the event with a corresponding function indicate the event is occurring less frequently such that fewer instances are required to execute the corresponding function; and
            dispatching the event to the new instance in the pool for execution on a host server.

2. The method of claim 1, further comprising:
    dispatching the event to an existing instance in the pool in response to determining that the instance in the pool includes the function corresponding to the event.

3. The method of claim 1, wherein the status is busy or idle.

4. The method of claim 1, wherein the historical frequency occurrence patterns are stored in and accessible from a historical data store.

5. The method of claim 1, wherein each of the instances are modeled as an G/G/I queue, with the average arrival rate of the events in the instances and the average runtime rate for each function executed by the instance follow a general distribution.

6. The method of claim 1, wherein the instance includes a resource associated with one or more servers in the distributed computing environment.

7. A non-transitory computer-readable medium storing computer instructions for handling events in a distributed computing environment, that when executed by one or more processors, perform the steps of:
    receiving an event stored in a queue of one or more events, wherein the event comprises a function executable by an instance in a pool of instances and a number of instances in the pool defines a pool capacity;
    allocating a percentage of the pool capacity to each of the functions using a distribution model based on a historical frequency of occurrence patterns for the one or more events, the historical frequency of occurrence patterns including an average arrival rate of the functions received from the queue of one or more events and an average runtime rate for each function executed by the instance received from the pool of instances;
    mapping the event to the instance in the pool that is executing a corresponding function, the mapping comprising:
        requesting a status of the function corresponding to the event from a function data store, wherein the function status store stores the status of instances and instance associated functions;
        receiving a response from the function data store indicating the status of the one or more instances in the pool having the function corresponding to the event;
        in response to determining that the instances in the pool are at least one of unavailable and do not include the function corresponding to the event,
            creating a new instance in the pool the new instance including the function corresponding to the event, and
            terminating one or more of the instances in the pool when the frequency of occurrence patterns of the event with a corresponding function indicate the event is occurring less frequently such that fewer instances are required to execute the corresponding function; and
            dispatching the event to the new instance in the pool for execution on a host server.

8. The non-transitory computer-readable medium of claim 7, the one or more processors further performing the steps of:
    dispatching the event to an existing instance in the pool in response to determining that the instance in the pool includes the function corresponding to the event.

9. The non-transitory computer-readable medium of claim 7, wherein each of the instances are modeled as an G/G/I queue, with the average arrival rate of the events in the instances and the average runtime rate for each function executed by the instance follow a general distribution.

10. The non-transitory computer-readable medium of claim 7, wherein the historical frequency occurrence patterns are stored in and accessible from a historical data store.

11. A network device for handling events in a distributed computing environment, comprising:
    a non-transitory memory storage comprising instructions; and
    one or more processors in communication with the memory, wherein the one or more processors execute the instructions to:
        receive an event stored in a queue of one or more events, wherein the event comprises a function executable by an instance in a pool of instances and a number of instances in the pool defines a pool capacity;

allocate a percentage of the pool capacity to each of the functions using a distribution model based on a historical frequency of occurrence patterns for the one or more events, the historical frequency of occurrence patterns including an average arrival rate of the functions received from the queue of one or more events and an average runtime rate for each function executed by the instance received from the pool of instances;

map the event to the instance in the pool that is executing a corresponding function, the mapping comprising:

request a status of the function corresponding to the event from a function data store, wherein the function status store stores the status of instances and instance associated functions;

receive a response from the function data store indicating the status of the one or more instances in the pool having the function corresponding to the event;

in response to determining that the instances in the pool are at least one of unavailable and do not include the function corresponding to the event, create a new instance in the pool the new instance including the function corresponding to the event, and terminate one or more of the instances in the pool when the frequency of occurrence patterns of the event with a corresponding function indicate the event is occurring less frequently such that fewer instances are required to execute the corresponding function; and dispatch the event to the new instance in the pool for execution on a host server.

12. The network device of claim 11, wherein the one or more processors further execute the instructions to:

dispatch the event to an existing instance in the pool in response to determining that the instance in the pool includes the function corresponding to the event.

13. The network device of claim 11, wherein each of the instances are modeled as an G/G/I queue, with the average arrival rate of the events in the instances and the average runtime rate for each function executed by the instance follow a general distribution.

14. The network device of claim 11, wherein the historical frequency occurrence patterns are stored in and accessible from a historical data store.

* * * * *